US005630529A

United States Patent [19]

Chlupp

[11] Patent Number: 5,630,529

[45] Date of Patent: May 20, 1997

[54] PIERCING TAP AND METHOD OF USE THEREFOR

[76] Inventor: Christopher F. Chlupp, 1334 Pine St., LaCrosse, Wis. 54601

[21] Appl. No.: 494,534

[22] Filed: Jun. 26, 1995

[51] Int. Cl.$^6$ .................................................... G01F 11/00

[52] U.S. Cl. ............................... 222/1; 222/83.5; 222/88; 222/108; 222/189.07

[58] Field of Search .................................. 222/1, 81, 83, 222/83.5, 88, 108, 183, 189.6, 189.7, 541.2

[56] References Cited

U.S. PATENT DOCUMENTS

| | | | |
|---|---|---|---|
| 438,475 | 10/1890 | Green . | |
| 1,088,332 | 2/1914 | Disher . | |
| 1,806,363 | 5/1931 | Narbo . | |
| 2,245,698 | 6/1941 | Miller | 221/23 |
| 2,262,628 | 11/1941 | Wilson | 222/189.06 |
| 3,219,240 | 11/1965 | Campbell, Jr. | 222/183 |
| 3,239,104 | 3/1966 | Scholle | 222/88 X |
| 3,363,807 | 1/1968 | Powell | 222/183 X |
| 4,437,583 | 3/1984 | O'Connor | 222/108 |
| 4,516,691 | 5/1985 | Christine et al. | 222/83.5 |
| 4,562,940 | 1/1986 | Asphar | 222/88 |
| 5,118,009 | 6/1992 | Novitsky | 222/88 X |
| 5,249,708 | 10/1993 | Magness | 222/83 |
| 5,368,205 | 11/1994 | Groh | 222/189.06 |

FOREIGN PATENT DOCUMENTS

| | | |
|---|---|---|
| 208180 | 12/1923 | United Kingdom . |

*Primary Examiner*—Joseph Kaufman

*Attorney, Agent, or Firm*—Richard C. Litman

[57] ABSTRACT

An apparatus for tapping a container including an open-ended shell with an interiorly-disposed absorbent pad, both having a radial aperture. A sleeve, in registration with the aperture, slidingly and sealingly receives a tap assembly. The tap assembly includes a tubular tap with a radially extending pin and a split collar having a slot for receiving the pin. The shell closely receives a container, then the user urges the tap through the sleeve toward the container and pierces the container. Flowable material in the container flows out of the tap. A method of use is also provided.

8 Claims, 3 Drawing Sheets

PIERCING TAP AND METHOD OF USE THEREFOR

BACKGROUND OF THE INVENTION

1. Field of the Invention

This invention relates to containers and opening means therefor. More specifically, the present invention relates to retractable, piercing taps adapted for use with resilient containers of flowable matter.

2. Description of the Prior Art

Sealed containers play an integral role in virtually every facet of modern life. Comestibles and durable goods alike are packaged and transported, retailed and secured in cans or glued cartons. Despite the usefulness of sealed containers, consumers are often frustrated attempting to release stored items from their seemingly impenetrable shell.

One group of container opening conventions includes containers having frangible members that permit the user to remove an entire container wall or portion thereof. Another group of container opening conventions includes piercing the container to permit flowable materials to flow out. The present invention falls within the piercing group.

When piercing a container, the user typically grasps the container manually or places the container against a resilient surface, then forces a tap through a container wall. Frequently, containers are constructed from thin materials sufficient to withstand the hydrostatic or static forces of its contents, but little else; the container readily deforms under minimal loading. Grasping the container or forcing a tap through the container wall usually deforms the container. Unluckily, the user sometimes exerts too much force and drives the tap through the container and the surface behind it causing, if not pain, a mess. A need exists for an invention providing a user with means to pierce a container without risking injury and spills due to container deformation.

Several types of piercing taps and methods are described in the literature. Unfortunately, the prior art fails to provide maintaining a container without deforming it. For example, U.S. Pat. No. 438,475, issued Oct. 14, 1890, to Daniel Green, U.S. Pat. No. 1,088,332, issued Feb. 24, 1914, to Harry P. Disher, U.S. Pat. No. 1,806,363, issued May 19, 1931, to Lauritz M. Narbo, U.S. Pat. No. 2,245,698, issued Jun. 17, 1941, to Howard Miller and Great Britain Patent No. 208,180, published Dec. 20, 1923, issued to John Parkinson, describe hand held taps. As described above, the user grasps or otherwise fixes the container and manually forces the tap to pierce a container wall.

U.S. Pat. No. 5,249,708, issued Oct. 5, 1993, to Thomas Magness, describes a container puncture spout. The apparatus includes a collar which slidingly receives a tap. The user mounts the collar on a container, slides the tap therethrough and pierces the container.

Clearly, the above demonstrates a need for a piercing tap and method of use therefor including means for maintaining a container without deforming it.

None of the above references, taken alone or in combination, are seen as teaching or suggesting the presently claimed piercing tap and method of use therefor.

SUMMARY OF THE INVENTION

The present invention overcomes the above limitations of the above inventions by providing means for maintaining a container without deforming it during piercing. The invention includes an open ended shell with an interiorly-disposed absorbent pad, both having a transverse aperture. A sleeve, in registration with the aperture, slidingly and sealingly receives a tap assembly. The tap assembly includes a tubular tap including a pin extending transversely therefrom and a split collar having a slot for receiving the pin. The split collar is uncurled sufficiently receive the tap, then the collar is released to sealingly conform to the outer surface of the tap with the pin disposed in the slot.

In operation, the shell closely receives a container. The user urges the tap to pierce the container. Flowable material in the container flows out of the tap.

In consideration of the above, an object of the invention is to provide a piercing tap and method of use therefor that provides for maintaining a container in a non-deformed state during piercing.

Another object of the invention is to provide a piercing tap and method of use therefor that provides for insulating the container.

A further object of the invention is to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features of the invention consistently throughout the attached drawings.

DETAILED DESCRIPTION OF THE PREFERRED EMBODIMENT

1. Piercing Tap

Figure 1:
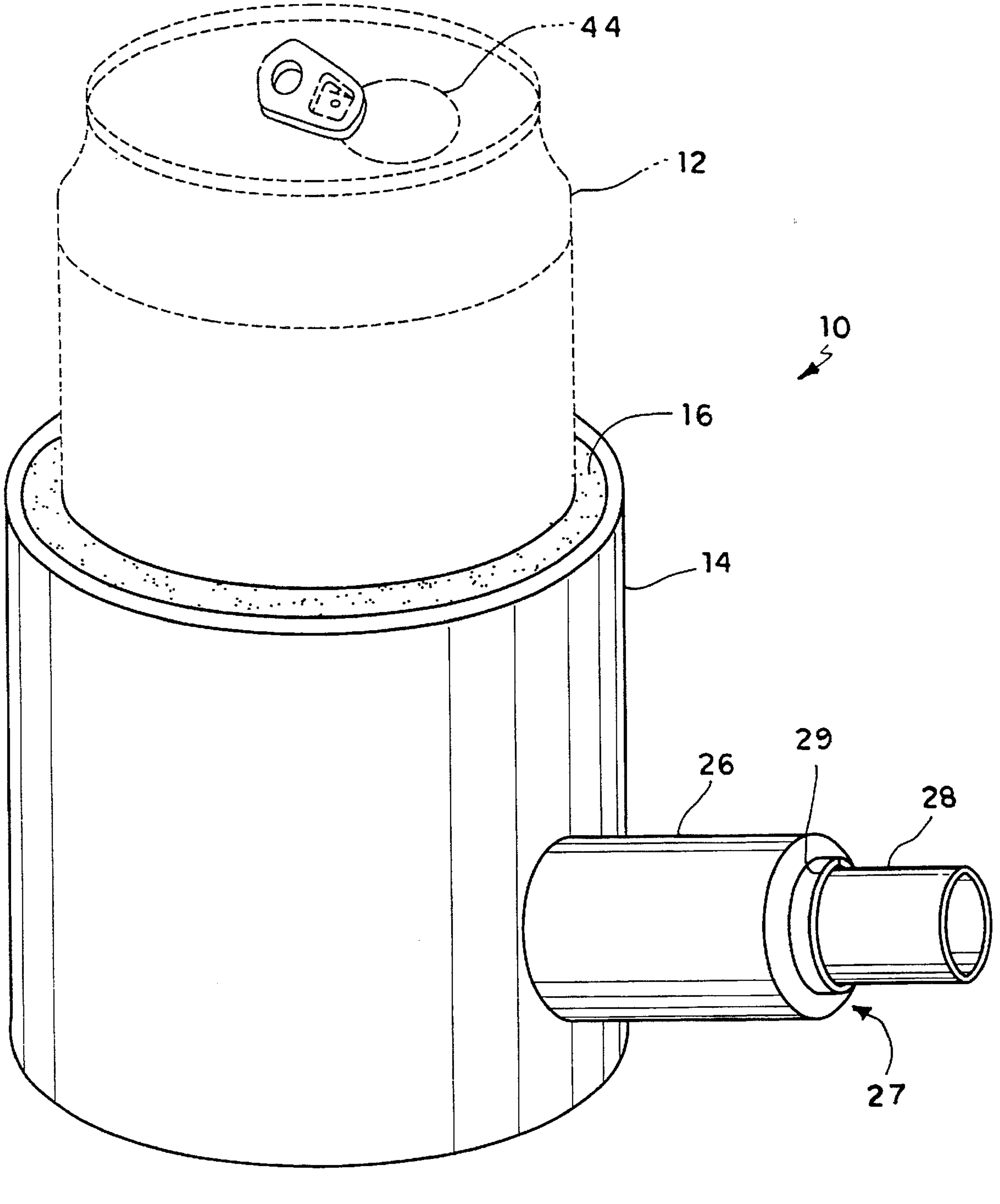
FIG. 1 is an environmental perspective view of the invention receiving a container with a container received therein shown in dashed lines.

Referring to FIG. 1, an environmental perspective view of the invention 10 receiving a container 12 is shown.

Figure 2:
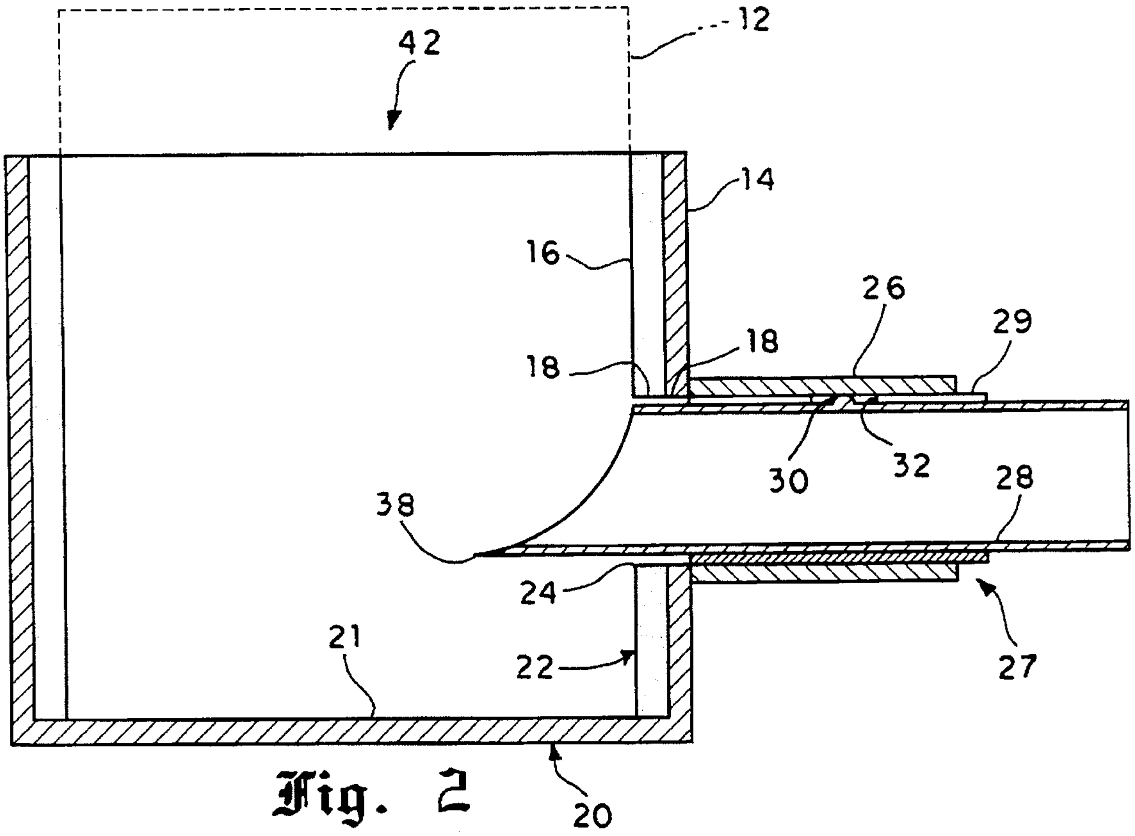
FIG. 2 is a cross-sectional detail view of the invention taken along a vertical plane bisecting the invention.

Referring to FIG. 2, a cross-sectional detail view of the invention 10 is shown. The invention 10 includes a rigid, open-ended cylindrical shell 14, preferably. The invention 10 is intended for use with cylindrical containers, such as beverage containers. However, the invention 10 may be configured to accommodate any container shape. The shell 14 closely follows the contours of the container 12. Peripheral maintenance of the container 12 reduces deformation of the container 12 when radial loads are imparted thereagainst.

The invention 10 is shown being constructed from steel. However, the invention 10 may be constructed from any rugged material including, but not limited to: polyolefins, polystyrenes, copolymers containing the same; acrylonitrile/butadiene/styrenes copolymers, polyacrylates, polymethacrylates, phenolics or the like.

An absorbent pad 16 is disposed within the shell 14. The pad helps to maintain close contact between the shell 14 and container 12. The pad 16 may have insulative characteristics for maintaining the temperature of the container 12.

The shell 14 and pad 16 have a throughbore 18 radially disposed therethrough. Since the contents of the container 12 flow through the throughbore 18, the throughbore 18 should be disposed proximate to the closed end 20 of the shell 14, reducing the lip 22 between the container bottom 21 and an aperture 24 pierced in the container 12. Close proximity of the throughbore 18 and closed end 20 reduces the amount of flowable material that may be trapped by the lip 22 and irretrievable.

A sleeve 26 is mounted on the shell 14 in registration with the throughbore 18. The sleeve 26 may be constructed integral with the shell 14. The sleeve 26 may also threadingly engage the shell 14.

Figure 3:
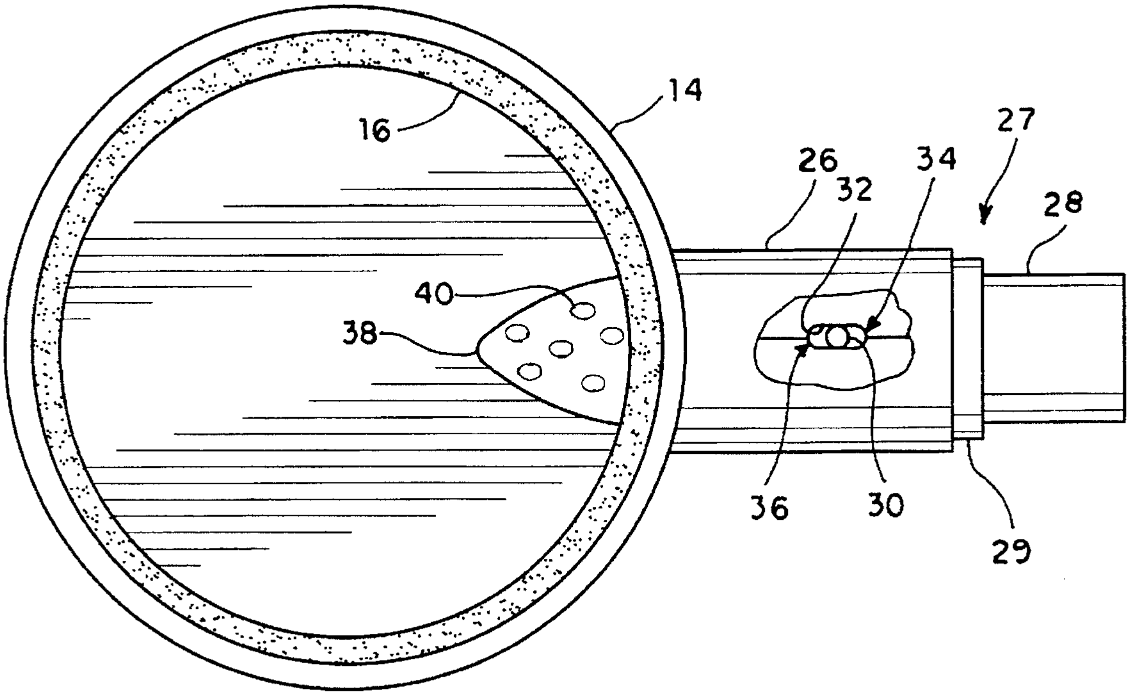
FIG. 3 is a top plan view of the invention with a portion of the sleeve broken away to reveal the collar receiving the pin of the tap.

Referring also to FIG. 3, the sleeve 26 slidingly and sealingly receives a tap assembly 27. The tap assembly 27 includes a split cylindrical collar 29 having a slot 32 radially disposed therein. The slot 32 is shown being defined by half slots disposed in the longitudinal edges along the split of the collar 29 for manufacturing ease. However, the slot 32 may be disposed at any annular location along the collar 29. A hollow tap 28 is slidingly and sealingly received in the collar 29. The tap 28 includes a locating pin 30 which is slidingly received in the slot 32. The slot 32 is configured such that when the pin 30 contacts the back end 34 of the slot 32, the tap 28 is fully retracted. When the tap 28 is fully retracted, a container 12 may be inserted freely in the shell 14. When the pin 30 contacts the front end 36 of the slot 32, the tap 28 is fully extended. When the tap 28 is fully extended, it pierces the container 12.

The tap 28 has a hardened, piercing tip 38. The tip 38 is shown having an asymmetrical, hyperbolic shape. However, the tip 38 may assume a bullet, conic, pyramid or other shape.

The tap 28 also includes a coarse grate 40 shown integral with the tip 38. The grate 40 screens the material flowing from the container 12 through the tap 38. The grate 40 helps to deter consumption of particles of the container 12 that may break loose and contaminate the flowable material when the tap 38 punctures the container 12.

2. Piercing Tap Method of Use

Figure 4:
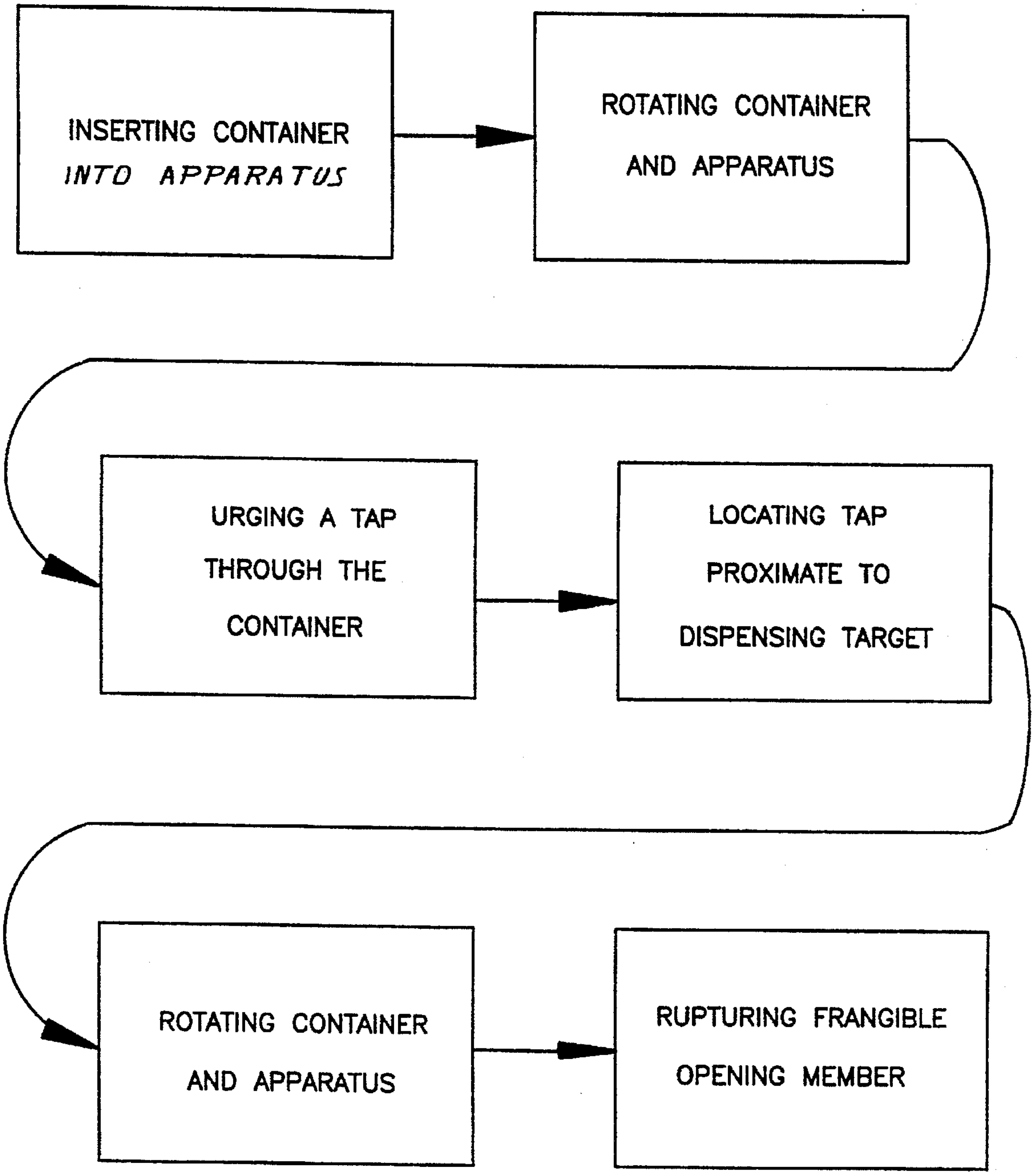
FIG. 4 is a flow diagram of the method claimed herein.

Referring to FIG. 4, the present method includes inserting a container 12 in the open end 42 of a tapping apparatus 10 for complementary contact therewith. The container 12 and shell 14 are rotated such that a tap 28 is upwardly disposed. The method includes urging a tap 28 through a transversely disposed throughbore 18 in the shell 14 into the container 12 and releasing any pressurized compressible fluid therein. The tap 28 is located proximate to the dispensing target, such as the user's mouth. The container 12 and shell 14 are rotated such that the flowable contents of the container 12 flow through the tap 28 into the dispensing target.

An additional step may include rupturing a conventional frangible opening member 44 typical to beverage containers. Rupturing the opening member 44 increases the flow rate from the container 12 through the tap 28.

The present invention is not intended to be limited to the sole embodiment described above, but to encompass any and all embodiments within the scope of the following claims.

I claim:

1. An apparatus for tapping a container comprising:

a cylindrical shell having an open end and a throughbore, said shell being dimensioned and configured to closely receive a cylindrical container;

a cylindrical tap received through said throughbore, said tap having a piercing tip at a first end and an opposite open end;

a cylindrical sleeve mounted on said shell at said throughbore, said sleeve slidingly receiving said first end of said tap;

a cylindrical collar sealingly interposed between said sleeve and said tap; and a pad disposed within said shell, said pad having a second throughbore in registration with said throughbore in said shell for receiving said tap, whereby a user may pierce the container by slidable inserting said first end of said tap through said sleeve, causing flowable material to exit out said open end of said tap.

2. An apparatus as recited in claim 1, said tap including a pin extending radially therefrom; and said collar having a split and a slot disposed along a portion of said split, said pin being received in said slot, said tap being translatable from a retracted position to an extended position.

3. An apparatus as recited in claim 1, said tap including strainer means for filtering the flowable material as it flows from the container through said tap.

4. An apparatus for tapping a container comprising:

a cylindrical shell having an open end and a throughbore, said shell being dimensioned and configured to closely receive a cylindrical container;

a cylindrical tap received in said throughbore, said tap having a first end and an opposite open end, said first end having a piercing tip for puncturing the container, said tap including a pin fixedly disposed intermediately between said first end and said opposite open end;

a cylindrical sleeve mounted on said shell at said throughbore, said sleeve slidingly receiving said tap;

a cylindrical collar sealingly interposed between said sleeve and said tap, said collar having an elliptical slot, said pin being received in said slot for maintaining said tap within said collar during both a retracted and an extended position;

whereby a user slides said tap through said sleeve, piercing the container, and causing flowable material to flow out said opposite open end of said tap.

5. An apparatus as recited in claim 4, further including an absorbent pad disposed within said shell, said absorbent pad having a second throughbore in registration with said throughbore in said shell.

6. An apparatus as recited in claim 4, said tap including strainer means for filtering the flowable material as it flows from the container through said tap, said collar having a split, said slot being disposed along a portion of said split.

7. A method for tapping a container comprising the steps:

inserting a container in the open end of a tapping apparatus;

rotating the container and apparatus and orienting the tap upwardly;

urging the tap through the container;

locating the tap proximate to the dispensing target; and rotating the container and apparatus and inducing flow of the flowable material through the tap.

8. A method as recited in claim 7, including rupturing the frangible opening member of the container and increasing the flow rate of the flowable material through the tap.

* * * * *